Aug. 12, 1947.  B. F. SCHULTE  2,425,688
COLLAPSIBLE GOLF CLUB CARRIER
Filed June 6, 1945
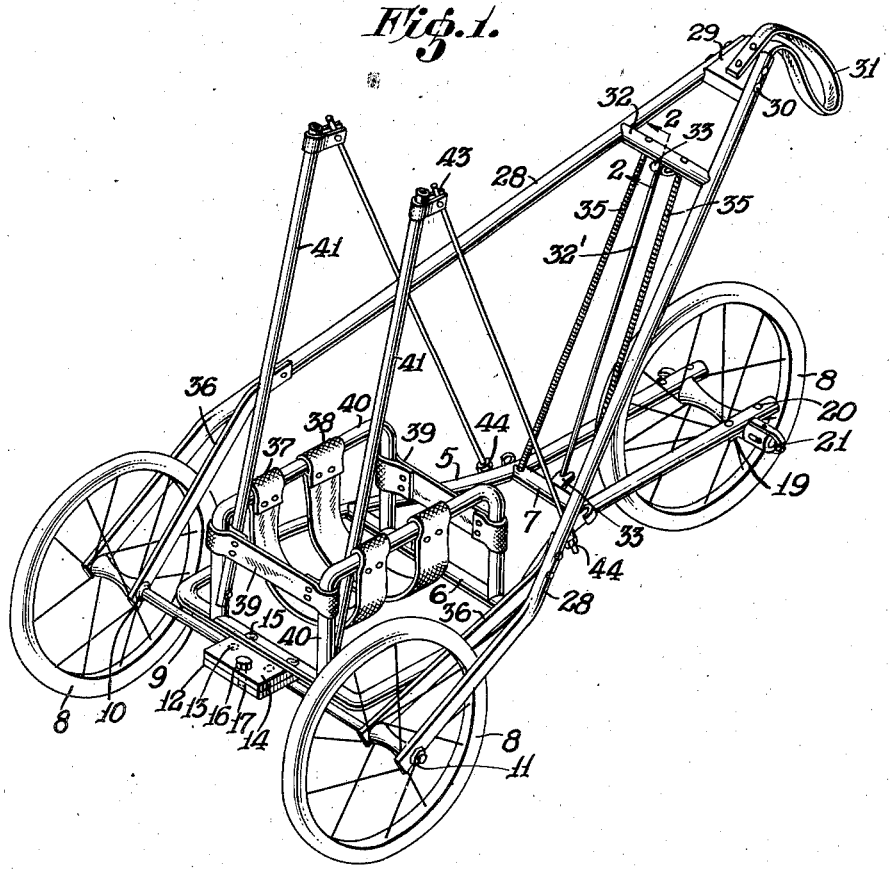
INVENTOR:
BERNARD F. SCHULTE,
BY Victor M. Langsett
ATTORNEY Patented Aug. 12, 1947

2,425,688

UNITED STATES PATENT OFFICE 2,425,688

COLLAPSIBLE GOLF CLUB CARRIER

Bernard F. Schulte, Highland Park, Ill., assignor of one-half to Victor M. Langsett, Chicago, Ill.

Application June 6, 1945, Serial No. 597,725

12 Claims. (Cl. 280—36)

This invention relates generally to golf club carriers and more particularly to an improved mobile carrier supporting and carrying the player's golf bag and a plurality of clubs, with collapsible features facilitating the storing and transportation of the device.

An object of my invention is to provide a golf bag and club carrier under the direct control of the player which operates with sufficient ease to reduce the fatigue which results from personally carrying the modern golfing equipment and also eliminate the expense of and reliance upon human caddies.

Another object of my invention is to provide a device which will receive and carry the player's golf bag and clubs in their usual arrangement, without transfer, positioned to be readily accessible in play, and of sufficient sturdiness to meet the stress and strain of operation over a golf course.

Another object of my invention is to provide a device which collapses sufficiently to reduce its bulk, facilitating storage or its transportation to and from the golf course in a motor vehicle.

Further objects and advantages of the invention will be apparent from the following specification and the accompanying drawings, wherein a preferred embodiment of the invention has been shown and described.

In the drawings:

Figure 1 is an isometric view of one form of a device embodying my invention.

Figure 2 is a cross-sectional view of one of the clamping arrangements taken on the line 2—2 of Figure 1.

Figure 3 is a side view of one of the fastening devices 44 in Figure 1.

Figure 4 is a front view of one of the spring clamps 21 in Figure 1.

Similar numerals refer to similar parts throughout the several views.

As illustrated in the drawings, the device includes a general frame 5 formed preferably from tubular piping, braced by the cross-stays 6 and 7, attached to its interior faces by any suitable means like welding. This frame is supported upon three rubber tired, ball-bearing bicycle type wheels 8, of any appropriate diameter, though I prefer wheels with a diameter of one foot, disposed in tricycular form. Two of these wheels 8, rotate on an axle 9 and are held in position at its ends by the collars 10 and the nuts 11 turning on screw threads upon the ends of said axle. A metal plate 12 is fastened to the upper center of said axle by any suitable means such as countersunk rivets 13. A similar metal plate 14 is fastened to the front, center and lower surface of the frame 5 by any suitable means such as countersunk rivets 15. The plate 14 rests upon the plate 12 and are held together by the king bolt 16 passing through the center hole 17 in both plates, permitting the axle to turn in relation to the frame for steering purposes. The rear wheel is positioned between the ends of the frame 5 and rotates upon an axle 18. The axle 18 is attached to the frame ends by the straps 19 and any suitable fastening means such as rivets 20.

The axle 18 is long enough to receive at its ends the annular bushings 21, which are held in place and slidable thereon by the slots 22 and the cotter pins 23 passing through the holes 24 in said axle. The flat springs 25 are attached to opposite faces of said bushings 21 by the stud screws 26 and screw threads 27, or any other suitable means.

Two forked members 28 furnish operating means or an operating device for propulsion. These are formed from tubular piping, flattened and slightly bent at one end to form a fork with the assistance of metal straps 36 fastened thereto by rivets or any suitable means, said fork straddling the front wheel and the axle 9 passing through holes in the ends thereof. The other ends of said members converge together and are fastened to and braced by the triangular wooden block 29 by any suitable means such as the rivets 30 and to which block a suitable handle, such as 31, is attached. Further rigidity is given to the members 28 by the cross bar 32 fastened thereto by welding or other suitable means.

To give flexibility and maintain the handle 31 at a proper height, convenient to the player, a pivot device comprising a rod 32 with a ball head on each end, of the desired length, is supported between and at the centers of the cross bars 7 and 32 by the spring clamps 33 which are fastened to said cross bars by any suitable means such as the rivets 34. To give a greater feeling of life to the assembly, I attach two coil springs 35 to and from the cross bars 7 and 32, the attachment being by any suitable means such as studs or cotter pins. These springs also tend to maintain the wheels in alignment. The spring clamps 33 are bifurcated so that the rod 32' can easily be removed in its entirety or at either end.

No claim is made to the feature of mobility in the above described carriage.

The golf bag and a plurality of clubs therein are supported on the frame 5 in a cradle formed by two parallel double bent members 40, preferably of tubular piping, fastened by any suitable means such as welding at right angles to the upper surfaces of and extending from the front of the frame 5 to the cross bar 6 with strips of webbing or other suitable material suspended from the horizontal portions thereof to give support to the bottom of the golf bag and strips 39 fastened to the vertical ends to prevent the bag from slipping forwards or backwards. It is at once apparent that additional strips of webbing can be added if necessary, and particularly, strips fastened cross-wise to prevent any disarrangement among the strips in relation to each other. The members 40 are spaced so as to admit the bottom of a golf bag without binding.

The golf bag is maintained in an up-right position with the clubs readily available to the player by passing a strap about the bag and the members 41, preferably of tubular piping, fastened at one end to the inside of the front upright of the members 40 near their juncture with the frame 5 by any suitable means such as a bolt serving as a pivot. The members 41 are maintained in an approximately upright inclination by two rods 42 attached to the upper end of the members 41 by strap clamps 43 and extending to the sides of the frame 5 where they are held in position by the clamping brackets 44. This bracket 44 consists of a J-shaped metal strip 45 formed and attached to the frame 5 by the countersunk rivet 46 with a thumb eccentric pivoting by means of the rivet 48 thereon and which embraces the end of the rod 42, which is prevented from moving and rattling by an upper and lower nut 49 screwed upon its threaded end with a rubber collar 50 therebetween.

While I have shown my invention in the particular embodiments above described, I do not limit myself thereto as I may employ equivalents thereof without departing from the spirit and scope of the appended claims.

In operation, a golf bag containing a plurality of clubs is set in the cradle and held in an upright position by a strap encircling the bag and the members 41, and the carrier then pushed, propelled or pulled by the player about the golf course.

To collapse the carrier after use, the golf bag and clubs are removed, the rods 42 are released from the clamping arrangement 44, the rod 32' removed or unclamped at its point of connection with the cross bar 32, the members 28 collapsing over the frame 5 and rear wheel and held in position by the spring clamps 25 engaging said members 28, the members 41 and rods 42 folding back on substantially the same plane.

I claim as my invention:

1. A carrier for golf bag and clubs comprising a frame mounted upon a plurality of wheels arranged for steering, means for pushing, pulling and steering by the operator directing the exerted force to the hubs of the forward wheels, pivot means maintaining a relative position between said operating means and said frame, means for collapsing said operating means over said wheeled frame, means for maintaining said collapsed position, means for supporting a golf bag and plurality of clubs upon said frame and collapsible means for holding said golf bag and clubs in an upright position.

2. In a carrier for golf bag and clubs, a frame mounted upon a steerable rolling support, an operating device for said carrier, a pivot device supporting said operating device in an inclined position relative to said frame comprising a member, one end of which is rotatably engaged to said operating device and the other end of which is rotatably engaged to said frame and means for supporting a golf bag and plurality of clubs upon said frame.

3. In a carrier for golf bag and clubs, a frame mounted upon a steerable rolling support, a device for operating said carrier, a pivot device supporting said operating device relative to said frame comprising bifurcated clamps attached to said frame and operating device, a ball-headed member engaged in and connecting said clamps and compensating coil springs attached to said frame and operating device to maintain resiliency therebetween.

4. In a carrier for golf bag and clubs, a frame mounted upon a plurality of wheels arranged for steering, a device for operating said carrier, a pivot device supporting said operating device in an inclined position relative to said frame comprising bifurcated clamps attached to said frame and operating device, a ball-headed member engaged in and connecting said clamps, readily removable, collapsing said operating device upon a plane with said frame.

5. In a carrier for golf bag and clubs, a frame mounted upon a plurality of wheels arranged for steering, a device for operating said carrier, a pivot device supporting said operating device in an inclined position relative to said frame comprising bifurcated clamps attached to said frame and operating device, a ball-headed member engaged in and connecting said clamps readily removable, permitting collapsing of said operating device upon a plane with said frame, and means maintaining said collapsed position.

6. A golf bag and club carrier comprising a frame mounted upon a plurality of wheels arranged for steering, a device for operating said carrier, a pivot device supporting said operating device in an inclined position relative to said frame comprising a member, one end of which is rotatably engaged to said operating device and the other end of which is rotatably engaged to said frame, a device for supporting a golf bag and plurality of clubs upon said frame and means for holding said golf bag and clubs in an upright position.

7. A golf bag and club carrier consisting of three ball-bearing, bicycle type wheels with two thereof spaced and rotating upon a single axle, two axles, a general frame mounted upon said axles, means for securing said frame to said axles and permitting one axle to turn for steering, an operating device comprising two forked members, said forks each straddling a wheel and pivoting at their ends upon the axle joining said wheels, inclined over said frame, means for fastening said members together, an operator's handle for controlling said carrier, pivot means for supporting said operating device in an inclined position relative to said frame, members attached to said frame with webbing strips suspended therebetween to form a cradle for supporting a golf bag and plurality of clubs, strips of webbing, means for supporting said golf bag in an upright position and devices for attaching the same to said general frame.

8. In a golf bag and club carrier, a frame mounted upon a plurality of wheels arranged for steering, a device adapted for pushing, pulling and steering said carrier, pivot means for supporting said device in an inclined position relative to said frame comprising a member, one end of which is rotatably engaged to said operating device and the other end of which is rotatably engaged to said frame and arranged to permit said device to be collapsed over said wheeled frame.

9. In a golf bag and club carrier, a device for operating said carrier, a wheeled frame and pivot means for supporting said operating device in an inclined position relative to said frame comprising a member, one end of which is rotatably engaged to said operating device and the other end of which is rotatably engaged to said frame arranged so that the said operating device may be collapsed over said wheeled frame.

10. In a golf bag and club carrier, a device for operating said carrier, a wheeled frame arranged for steering, pivot means for supporting said operating device in an inclined position relative to said frame arranged so that the said operating device may be collapsed over said wheeled frame, a device to retain said collapsed operating device and wheeled frame in the same plane relative to each other and collapsible means to support a golf bag and plurality of clubs upon said frame.

11. A golf bag and club carrier consisting of three ball-bearing, bicycle type wheels with two thereof spaced and rotating upon a single axle, two axles, a general frame mounted upon said axles, means for securing said frame to said axles and permitting one axle to turn for steering, an operating device comprising two forked members, said forks each straddling a wheel and pivoting at their ends upon the axle joining said wheels, inclined over said frame, means for fastening said members together, an operator's handle for controlling said carrier, pivot means for supporting said operating device in an inclined position relative to said frame, devices permitting the disjoinder of said means and the collapsing of said operating device and frame, coil springs to maintain resiliency between said frame and operating device, means to retain said frame and operating device in a collapsed position, members attached to said frames with strips of flexible material suspended therebetween forming a cradle to support a golf bag and plurality of clubs, strips of a flexible material, collapsible means for supporting said golf bag and clubs in an upright position in said cradle and devices for fastening the same to said frame and attached members.

12. A collapsible carrier for a golf bag and plurality of clubs consisting of a frame mounted upon a plurality of wheels arranged for steering, an operating device, pivot connecting means supporting said operating device in an inclined position relative to said frame comprising a member, one end of which is rotatably engaged to said operating device and the other end of which is rotatably engaged to said frame and capable of disconnection so that said operating device collapses over said wheeled frame and a device to support a golf bag and plurality of clubs upon said frame arranged for collapsing.

BERNARD F. SCHULTE.

REFERENCES CITED

The following references are of record in the file of this patent:

UNITED STATES PATENTS

| Number | Name | Date |
|---|---|---|
| 410,804 | McMakin | Sept. 10, 1889 |
| 993,066 | Hoey | May 23, 1911 |
| 1,166,463 | King | Jan. 4, 1916 |

FOREIGN PATENTS

| Number | Country | Date |
|---|---|---|
| 483,754 | Great Britain | Apr. 26, 1938 |